(12) United States Patent
Tomitaka et al.

(10) Patent No.: US 7,971,901 B2
(45) Date of Patent: Jul. 5, 2011

(54) AIRBAG APPARATUS

(75) Inventors: Akihiro Tomitaka, Kanagawa (JP);
Kazumasa Misawa, Kanagawa (JP);
Mitsuru Mochiduki, Aichi (JP)

(73) Assignees: Kanto Auto Works, Ltd., Kanagawa (JP); Toyota Jidosha Kabushiki Kaisha, Aichi (JP)

( * ) Notice: Subject to any disclaimer, the term of this patent is extended or adjusted under 35 U.S.C. 154(b) by 0 days.

(21) Appl. No.: 12/677,775

(22) PCT Filed: Sep. 12, 2008

(86) PCT No.: PCT/JP2008/066607
§ 371 (c)(1),
(2), (4) Date: Aug. 30, 2010

(87) PCT Pub. No.: WO2009/035114
PCT Pub. Date: Mar. 19, 2009

(65) Prior Publication Data
US 2010/0314859 A1 Dec. 16, 2010

(30) Foreign Application Priority Data

Sep. 14, 2007 (JP) ................................ 2007-240260
Sep. 16, 2007 (JP) ................................ 2007-240304

(51) Int. Cl.
*B60R 21/20* (2006.01)
(52) U.S. Cl. ................. 280/730.2; 280/743.1; 280/743.2
(58) Field of Classification Search ............... 280/730.2, 280/743.1, 743.2
See application file for complete search history.

(56) References Cited

U.S. PATENT DOCUMENTS

| | | | | |
|---|---|---|---|---|
| 3,655,217 A * | 4/1972 | Johnson | | 280/737 |
| 5,499,840 A | 3/1996 | Nakano | | |
| 5,833,312 A * | 11/1998 | Lenz | | 297/216.13 |
| 6,199,900 B1 * | 3/2001 | Zeigler | | 280/735 |
| 6,352,304 B1 * | 3/2002 | Sorgenfrei | | 297/216.13 |
| 6,572,137 B2 * | 6/2003 | Bossecker et al. | | 280/730.1 |
| 6,773,026 B2 * | 8/2004 | Meyer | | 280/729 |
| 2003/0178831 A1 * | 9/2003 | Roberts et al. | | 280/743.1 |
| 2004/0169356 A1 * | 9/2004 | Linder et al. | | 280/730.2 |
| 2005/0104340 A1 | 5/2005 | Hasebe et al. | | |
| 2005/0236819 A1 | 10/2005 | Riedel et al. | | |

(Continued)

FOREIGN PATENT DOCUMENTS

EP 2077207 A1 7/2009

(Continued)

OTHER PUBLICATIONS

International Search Report (ISR) issued in PCT/JP2008/066607 for Examiner consideration.

(Continued)

*Primary Examiner* — Toan C To
(74) *Attorney, Agent, or Firm* — Chen Yoshimura LLP (57) ABSTRACT

An airbag apparatus is provided by which, when an airbag collides with an occupant, the occupant can receive a reaction force from the airbag. An airbag apparatus (10A to 10B) inflates between two seats arranged in a vehicle width direction (20L, 20R, 21L, 21R) to protect an occupant (P). The airbag apparatus (10A to 10B) includes an inflator (12) and a folded airbag (11). When gas is jetted from the inflator (12) at a side collision, the airbag (11) is allowed to inflate and is abutted to a vehicle interior (35) to thereby suppress the move of the airbag (11) when the airbag (11) collides with the body of the occupant (P).

5 Claims, 10 Drawing Sheets

U.S. PATENT DOCUMENTS

2007/0040364 A1* 2/2007 Linder et al. ............... 280/730.2
2010/0237595 A1* 9/2010 Fukuyama et al. ........ 280/730.2

FOREIGN PATENT DOCUMENTS

| | | |
|---|---|---|
| JP | 3-281458 A | 12/1991 |
| JP | 4-135942 A | 5/1992 |
| JP | 5-208647 A | 8/1993 |
| JP | 7-267037 A | 10/1995 |
| JP | 2000-135961 A | 5/2000 |
| JP | 2000-185618 A | 7/2000 |
| JP | 2001-171468 A | 6/2001 |
| JP | 2004-217109 A | 8/2004 |
| JP | 2005-067272 A | 3/2005 |
| JP | 2005-145225 A | 6/2005 |
| JP | 2005-306377 A | 11/2005 |
| JP | 2008-100604 A | 5/2008 |
| JP | 2008-114713 A | 5/2008 |

OTHER PUBLICATIONS

Written Opinion (PCT/ISA/237) issued in PCT/JP2008/066607.
International Preliminary Report on Patentability Chapter II (PCT/IPEA1409) issued in PCT/JP2008/066607.

* cited by examiner

FIG.10

AIRBAG APPARATUS

TECHNICAL FIELD

The present invention relates to an airbag apparatus for protecting an occupant of an automobile. In particular, the present invention relates to an airbag apparatus for restricting the move of the body of an occupant sitting at an opposite side of a side collision to the collision side due to the backlash by the collision.

BACKGROUND ART

As a protection device for reducing the impact to occupants in the event of a frontal collision of an automobile, an airbag apparatus has been widely known. A conventional airbag apparatus is attached in a steering device or an instrument panel provided in front of the occupant, and in the event of a frontal collision of an automobile, the airbag is inflated at the front side of a driver seat and a front passenger seat to thereby restrain occupants sitting in the driver seat and the front passenger seat from moving to the front side. As a result, the occupants in the driver seat and the front passenger seat are effectively protected at the frontal collision of the automobile.

Figure 10:
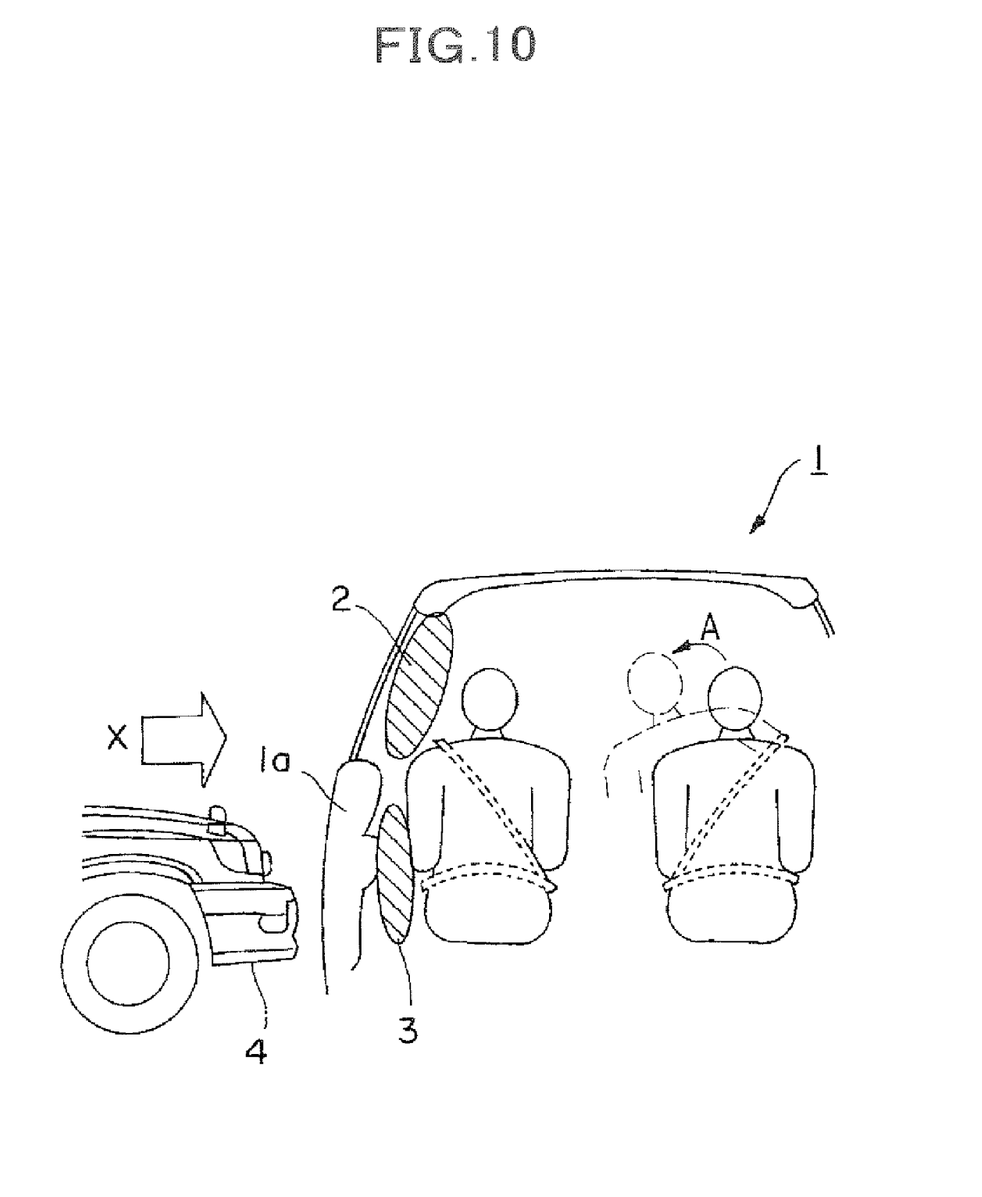
FIG. 10 is a schematic back view illustrating the configuration of an example of a conventional airbag apparatus.

In recent years, protecting an occupant in an automobile at a side impact of the automobile also has been considered important. Thus, so-called side airbag apparatuses and curtain shield airbag apparatuses have been mounted in vehicles. Specifically, as shown in FIG. 10 for example, at the front passenger seat-side of an automobile 1, a curtain shield airbag apparatus 2 is placed so as to inflate at the neighborhood of the inner side of the glass at the upper portion of a front door 1a. A side airbag apparatus 3 is placed so as to inflate at the neighborhood of the inner side of the lower portion of the front door 1a. In FIG. 10, although the curtain shield airbag apparatus 2 and the side airbag apparatus 3 are shown only at the front passenger seat-side, the curtain shield airbag apparatus 2 and the side airbag apparatus 3 are also provided at the driver seat-side in an actual case.

When another vehicle 4 laterally collides with the automobile 1 as shown by the arrow X in FIG. 10, the curtain shield airbag apparatus 2 and the side airbag apparatus 3 are respectively inflated at a position close to the inner sides of the front door 1a, i.e., an outer region of the front passenger seat, to thereby protect the body of the occupant of the front passenger seat from having a direct contact with the front door 1a.

On the other hand, Patent Publication 1 discloses an airbag apparatus that is attached in the ceiling of the vehicle interior and that is designed, in the event of a frontal collision of an automobile, to inflate downwardly to the front side of the occupant.

Patent Publication 2 discloses an airbag apparatus that is provided in a console between a driver's seat and a front passenger seat and that is designed to inflate, in the event of side collision of the automobile for example, between the seat back of the driver's seat and the seat back of the front passenger seat.

Patent Publication 3 discloses, for example, an airbag apparatus that is attached in an instrument panel in front of the front passenger seat and that is designed so that the airbag body is inflated at the front side of the occupant of the front passenger seat in the event of side collision of the automobile, a panel member provided in the vicinity of the ceiling is rotated in the lower direction, and a part of the airbag body inflated to the inner side of the vehicle interior is restricted from being moved to the rear side in the vicinity of the ceiling so as to be prevented from being inflated between the head of the occupant and the ceiling.

Patent Publication 4 discloses, for example, an airbag apparatus that is attached in the instrument panel in front of the front passenger seat, that is designed so that the main airbag body divided to left and right portions is caused, at the frontal collision of the automobile, to inflate in front of the occupant of the front passenger seat and the ceiling airbag body provided in the vicinity of the ceiling of the front passenger seat is caused to inflate in the lower direction and is engaged with a space between the divided left and right portions of the main airbag body inflated to the inner side of the vehicle interior to restrict the dislocation of the main airbag in the lateral direction to thereby prevent the main airbag from inflating in an unexpected direction.

However, in the event of side collision as shown in FIG. 10, an occupant at the opposite side of the side collision, i.e., the occupant in a driver's seat in the figure, may suddenly move to collision side as shown by the arrow A due to the backlash of the side collision.

On the other hand, the airbag apparatus according to Patent Publication 1 is configured so that the airbag is inflated from the ceiling to the front side of the occupant in a rear seat so as to protect the occupant from the frontal collision. However, this airbag apparatus is not configured so as to restrict the occupant at the side collision from moving to the collision side.

Furthermore, the airbag apparatuses according to Patent Publication 2 and Patent Publication 3 also have an objective of protecting an occupant at a frontal collision and are not configured so as to suppress, at a side collision, the occupant from moving to the collision side.

Thus, a center airbag apparatus has been suggested in recent years that causes an airbag to inflate between two seats.

In the airbag apparatus according to Patent Publication 4, the inflation at a side collision for example between the seat back of the driver's seat and the seat back of the front passenger seat prevents the situation where the occupant is caused by the impact load to fall to a side at which the impact is not sensed and has a contact with the neighboring occupant for example.

Patent Publications 5 and 6 also disclose a center airbag apparatus by which an airbag is caused to inflate at a side collision between the seat back of the driver's seat and the seat back of the front passenger seat.

Patent Publication 1: JP2000-185618A
Patent Publication 2: JP2005-067272A
Patent Publication 3: JP2005-145225A
Patent Publication 4: JP2004-217109A
Patent Publication 5: JP2008-114713
Patent Publication 6: JPH7-267037

DISCLOSURE OF THE INVENTION

Problem to be Solved by the Invention

In order to restrict the move of the body of an occupant, an airbag is desirably structured so that the occupant body receives a reaction from the airbag itself when the occupant body is struck with the airbag, However, in the case of the airbag as disclosed in Patent Publication 6 that inflates between seats, the airbag has no structure to prevent the inflated airbag from oscillating to the left and right sides because the airbag is placed at the center of the vehicle interior. This may prevent the occupant body from receiving a reaction.

In view of the above, an objective of the present invention is to provide an airbag apparatus inflating an airbag at a side collision in order to prevent an occupant from moving to the collision side due to the impact by the side collision so that the occupant receive a reaction from the airbag when the airbag strikes the occupant body.

Means for Solving the Problem

In order to achieve the objective, the present invention provides an airbag apparatus that inflates to the inner side of the occupant in the vehicle width direction in order to restrict, at a side collision, an occupant sitting in a seat at an impact opposite side from moving to the collision side. The airbag apparatus includes an inflator and a folded airbag. When the airbag is allowed to inflate due to the gas jetted from the inflator, the airbag is abutted to the vehicle interior. The vehicle interior in the present invention is not limited to the ceiling, the floor, and the windshield defining the vehicle interior and includes the floor carpet provided on the floor, a console provided on the floor, a seat cushion of a seat, a seat back and an armrest for example.

Effect of the Invention

According to the present invention, the airbag is caused to inflate between two seats arranged in the vehicle width direction and to be abutted with the vehicle interior such as a ceiling, a floor, a seat provided on the floor, or a console to thereby suppress, even when the occupant body bumps the airbag, the airbag itself from moving by the friction with the vehicle interior. Specifically, when the occupant bumps the airbag and pushes this airbag, the move of the airbag due to the bump can be suppressed. This can consequently provide a reaction force to the occupant to protect the occupant effectively.

DESCRIPTION OF REFERENCE NUMERALS

10, 10A, and 10B Airbag apparatus
Airbag
11*a* Airbag upper end
11*b* Airbag lower end
11*c* Airbag side face
12 Inflator
13 Case
20L Front seat (left seat)
20R Front seat (right seat)
21L Rear seat (left seat)
21L Rear seat (right seat)
25 Frame
26 Pad
26A Thin thickness portion
27 Covering material
27A Stitched portion
30 Vehicle
35 Ceiling
36 Vehicle interior lower side
40 Vehicle
50L Seat
51 Seat back
52 Seat cushion
110 Panel
111 Airbag door
121 Hook
130 Retainer
131 Door support portion
132 Side plate portion
133 Peripheral support portion
210 Seat back side portion

BEST MODE FOR CARRYING OUT THE INVENTION

The following section will describe the present invention in detail based on some embodiments shown in the drawings. In the drawings, Fr represents the vehicle front side, Up represents the vehicle upper side, and LH represents the left side in the vehicle width direction.

First Embodiment

Figure 1:
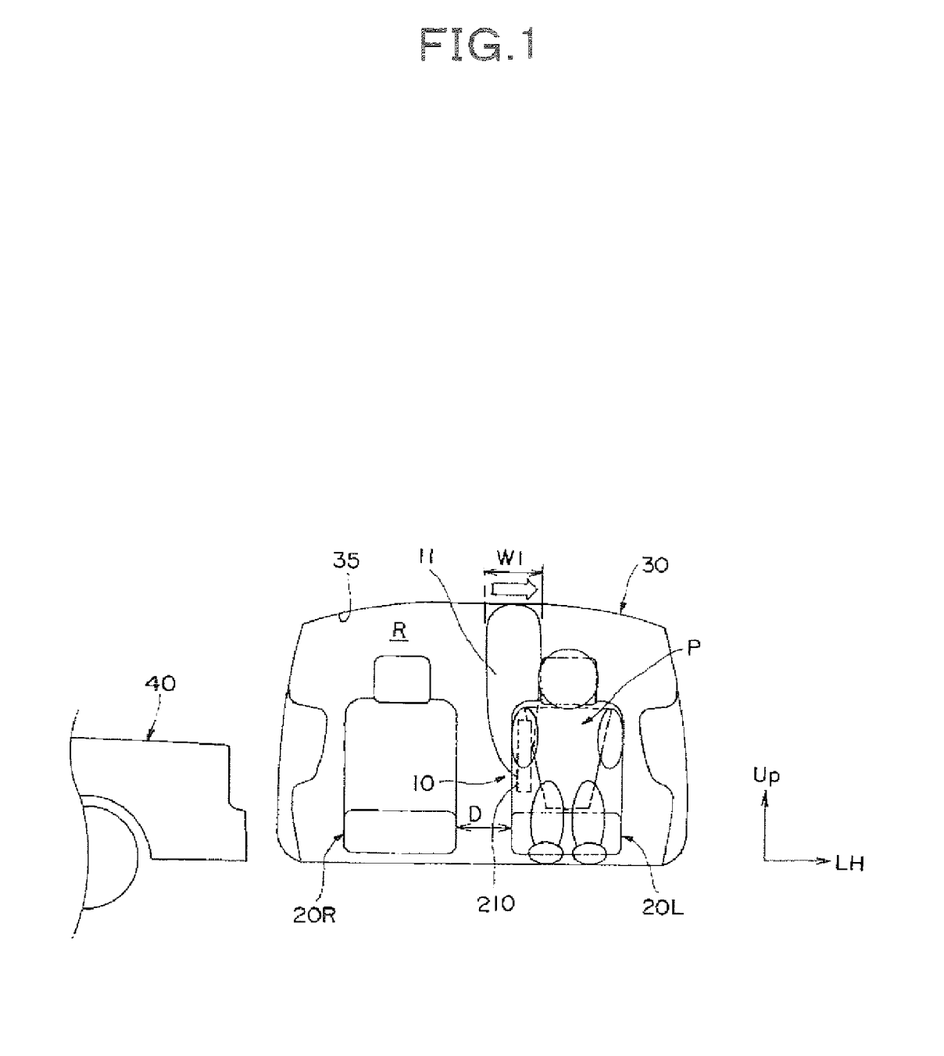
FIG. 1 illustrates an inflated status of an airbag apparatus according to the first embodiment of the present invention.

FIG. 1 illustrates the usage status of an airbag apparatus 10 according to the first embodiment of the present invention. FIG. 1 is a front view illustrating the vehicle seen from the front side to the rear side. The airbag apparatus 10 is structured to inflate an airbag 11 at the right side of an occupant P so that when a vehicle 30 including two seats 20L and 20R arranged in parallel to each other in the vehicle width direction is collided at a side thereof with another vehicle 40, i.e., at the right side of the vehicle with another vehicle 40 in the shown example, the occupant P sitting in the left seat 20L at the opposite side of the impact is restricted from moving to the right side at the collision side.

Figure 2:
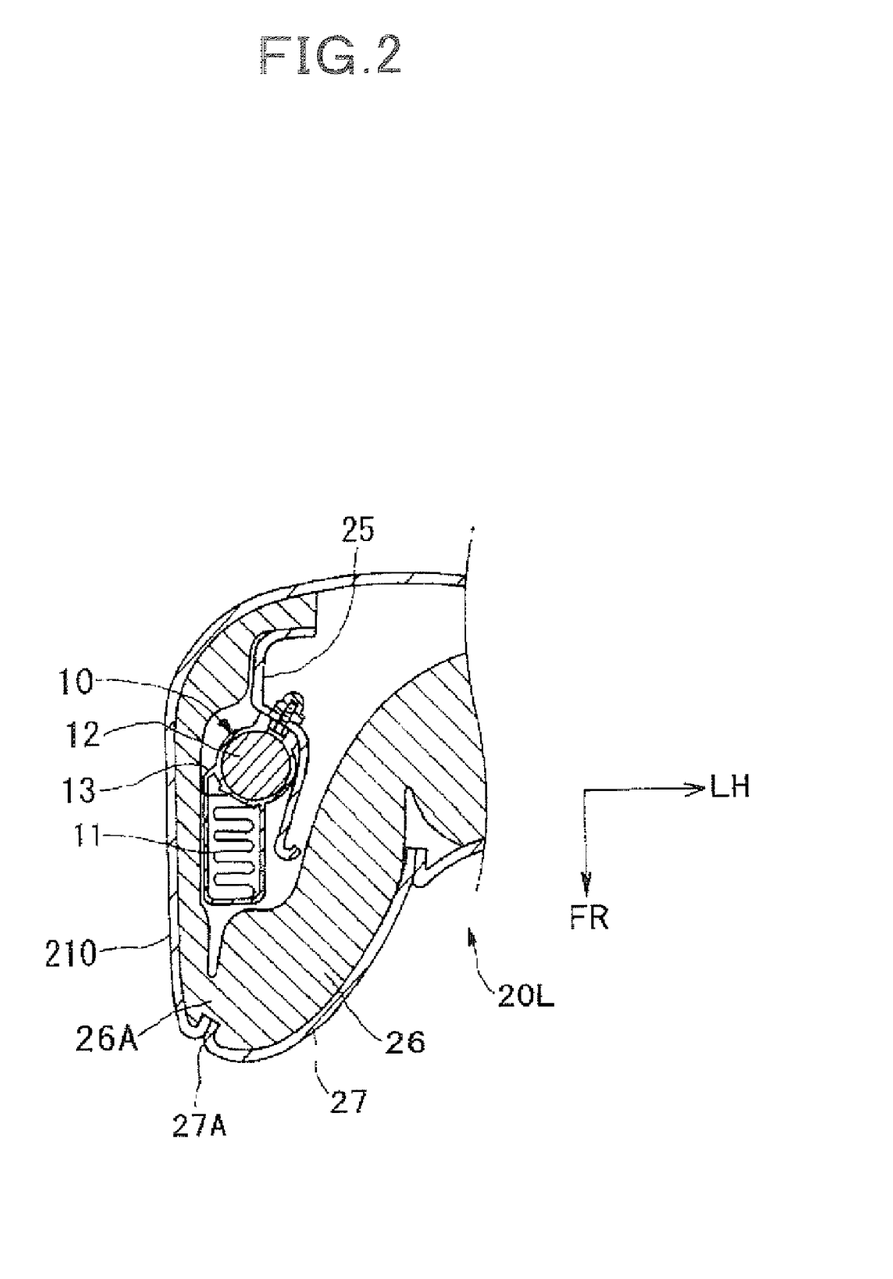
FIG. 2 is a cross-sectional view illustrating how the airbag is accommodated at the right side of the seat back of the left seat of FIG. 1.

Thus, in the shown example, the airbag apparatus 10 is provided, in the left seat 20L, at the inner side of the seat back in the vehicle width direction, i.e., in a seat back right portion 210 at the side opposed to the right seat 20R. FIG. 2 illustrates an example of the cross-sectional configuration of the seat back side portion 210 of the left seat 20L. The airbag apparatus 10 is attached to a frame 25 provided in the right portion of the left seat 20L. This airbag apparatus 10 includes, for example, an inflator 12 fixed to the frame 25 constituting the seat back and an airbag 11 that inflates by the gas jetted from this inflator 12. The airbag 11 is accommodated in a case 13 in the seat back in a folded status as shown in FIG. 2. The case 13 accommodating the inflator 12 and the airbag 11 is covered by a pad 26. The pad 26 is covered by covering material 27. In order to promote the inflation of the airbag 11 when the gas is jetted from the inflator 12 into the airbag 11, the pad 26 is formed to have a thin thickness portion 26A at which the portion of the airbag front side has a thinner thickness than those of other pad portions for example. The front side of the thin thickness portion 26A has a stitched portion 27A of the covering material 27. Thus, in a process of the inflation of the airbag 11, the inflating pressure of the airbag 11 causes the breakage of the thin thickness portion 26A and the stitched portion 27A to thereby form an inflated hole through which the airbag 11 is inflated into the vehicle interior.

Figure 3:
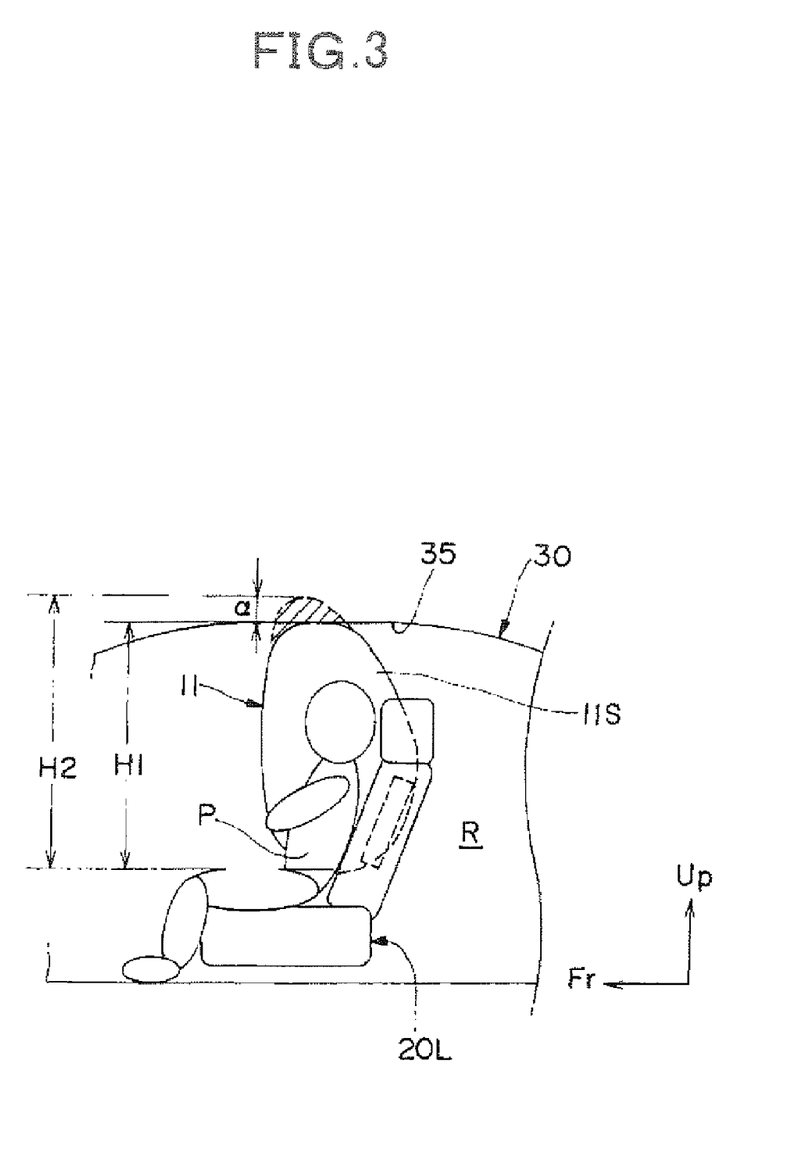
FIG. 3 is a schematic side view of FIG. 1.

The airbag 11 is made of a fabric cloth and is formed to have a bag-like shape. FIG. 3 is a side view of FIG. 1 in which the airbag 11 inflates, at the inflation thereof, at the side of the occupant P between the left seat 20L and the right seat 20R neighboring to the left seat 20L. This airbag 11 has, at the inflation thereof, a face 11S opposed to a wide range from the low back of the occupant P to the abdomen, the chest, the shoulder, and the head.

Furthermore, the airbag 11 of this embodiment is configured so that, at the inflation thereof, the upper end of the airbag is abutted to a ceiling 35. The airbag 11 has a height H1 that is set so that, while the airbag is being inflated from the seat back side portion 210 in the vehicle interior R, the upper end of the airbag is abutted to the ceiling 35 to thereby push the ceiling 35. Preferably, as shown by the diagonal lines in FIG. 3, if the ceiling 35 does not exist, the height H1 is set so that the airbag can inflate to the H2 which is higher than the ceiling 35 by about α mm, for example about 5 to 30 cm. Specifically, the airbag 11 has an inflation margin at the upper end thereof so that the airbag 11 is, at the inflation thereof, pushed to the ceiling 35 in a fixed area. The portion in the airbag 11 that is abutted to the vehicle interior as described above may be treated with a surface roughening for example so as to have an increased surface friction coefficient or may be configured by different material having a higher friction coefficient from that of other portions of the airbag. The portion in the airbag 11 abutted to the vehicle interior also may be configured, in order to have an increased rigidity compared to that of other portions, by superposing two cloths for example.

When the vehicle 30 having the airbag apparatus 10 thus configured at the right side of the seat back of the left seat 20L is collided with another vehicle 40 from the right side of the vehicle 30, the impact is detected by a sensor (not shown) and gas is instantly jetted from the inflator 12. As a result, as shown in FIG. 1, the airbag 11 instantly inflates at the side of the occupant P. Then, the upper end of the airbag 11 is pushed to the ceiling 35 in a fixed area.

Figure 4:
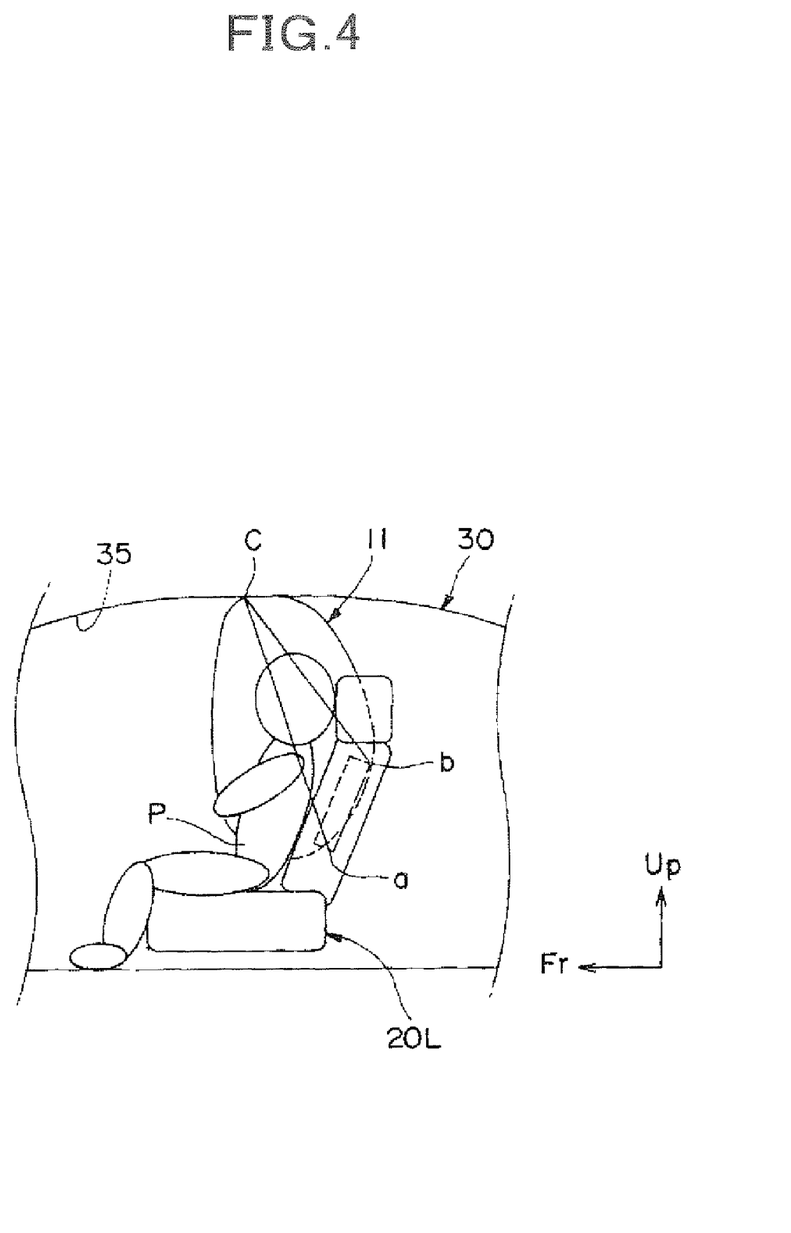
FIG. 4 illustrates the configuration of an airbag for effectively protecting the head of the occupant in the airbag apparatus according to the first embodiment.

As described above, according to the airbag apparatus 10 according to the first embodiment of the present invention, even when a side collision causes the occupant P to heavily collide with the airbag 11, the upper end of the airbag 11 abutted to the ceiling 35 with a high pressure provides the friction with the ceiling 35 to thereby suppress the airbag itself from moving to the collision side. Thus, a reaction force can be given to the occupant to protect the occupant P. As shown in FIG. 4, the inflated airbag 11 is supported and fixed, at the seat back side portion 210 of the seat 20L, between two points a and b separated in the up-and-down direction. The upper end thereof is also supported and fixed at one point c abutted to the ceiling 35. Thus, a triangular region obtained by connecting these points a-b-c functions as a side wall face region of the inflated airbag 11. By the side wall face of the airbag placed at the side of the head of the occupant P as described above, a high reaction force can be given to the lateral move of the head of the occupant P. This can consequently provide a secure protection of the upper body of the occupant P from the head to the low back.

Figure 5:
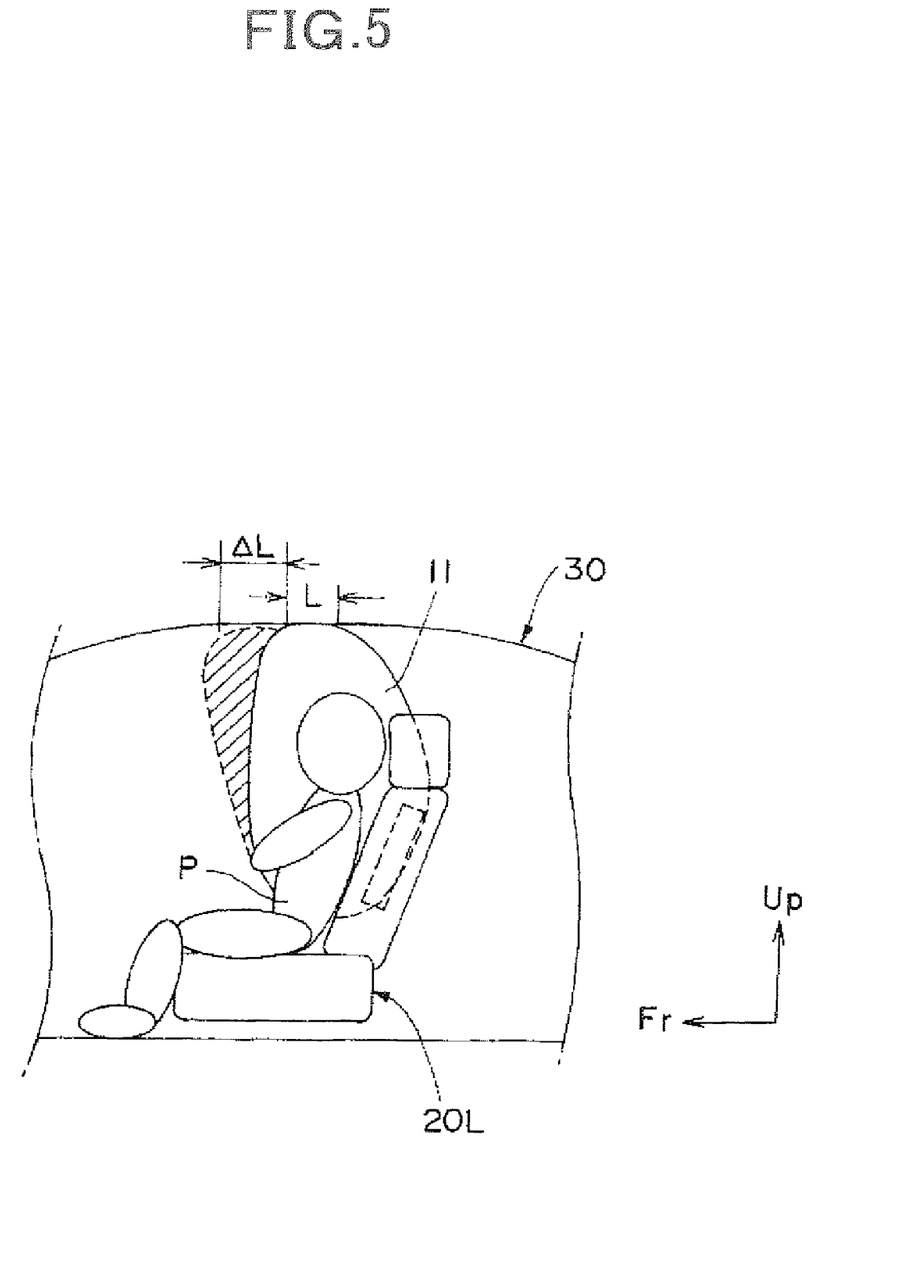
FIG. 5 illustrates the configuration of an airbag for increasing the friction force with the ceiling in the airbag apparatus according to the first embodiment.

In the configuration as described above in which the airbag 11 has, at the inflation thereof, the total height by which the airbag can inflate to a position substantially higher than the ceiling 35, since the ceiling 35 exists in an actual case, the upper end of the airbag 11 can be securely abutted to the ceiling 35 in a wide range to thereby further suppress the move of the airbag 11. In the case of the configuration as shown in FIG. 5 in which, the front-and-rear region width L, at which the upper end of the airbag 11 is abutted to the ceiling 35 at the inflation thereof, is further increased by about ΔL, the airbag 11 receives more friction from the ceiling 35. This can consequently further suppress the move of the airbag 11 by the collision of the occupant P.

Second Embodiment

Figure 6:
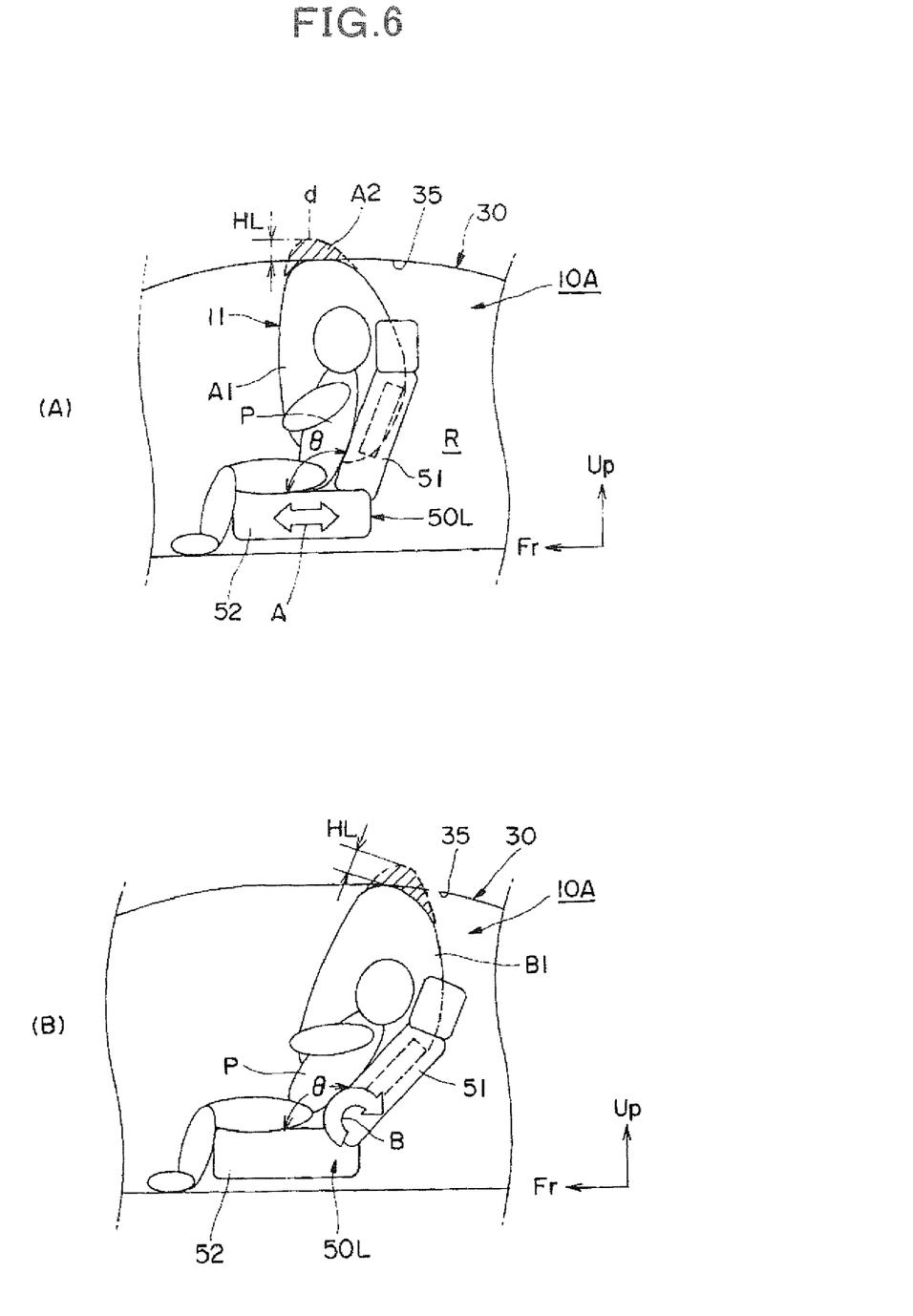
FIG. 6 illustrates an airbag apparatus according to the second embodiment of the present invention.

FIG. 6 illustrates the usage status of an airbag apparatus 10A according to the second embodiment of the present invention.

This airbag apparatus 10A is the same as the airbag apparatus 10 according to the first embodiment in including the airbag 11 and the inflator 12 but is different from the airbag apparatus 10 in that the airbag apparatus 10A is configured so as to protect the occupant P sitting in a seat 50L including a slide mechanism and/or reclining mechanism.

First, the airbag apparatus 10A corresponding to the slide mechanism will be described with reference to FIG. 6(A).

The following section will describe a case where a user moves the seat 50L by the slide mechanism in a front or rear direction shown by the arrow A to a different position while the seat back 51 is in a raised status, specifically, a status in which an angle θ formed by a seat back 51 to a seat cushion 52 is 115 degrees for example. The airbag 11 is configured so that the upper end of the airbag 11 is abutted to the ceiling 35 even when the airbag 11 is inflated as shown by the arrow A1 at an arbitrary seat position in the entire range within which the seat 50L can have a front-and-rear move. Specifically, the airbag 11 is configured so that, when a position at which the seat back 51 is inclined with an inclination angle of 115 degrees is assumed as a basic posture and when the airbag 11 is caused to inflate at this basic posture, the airbag 11 is upwardly protruded beyond the ceiling 35 if the ceiling 35 does not exist. The region A2 shown by the diagonal lines in FIG. 5 shows an inflatable region at which the airbag 11 is upwardly protruded beyond the ceiling 35 if the ceiling 35 does not exist. The height of this inflatable region is called a wrap amount HL. In the airbag 11 in the second embodiment, the wrap amount HL is set so that the upper end of the airbag 11 is abutted to the ceiling 35 in the entire range within which the seat 50L can have a front-and-rear move. Specifically, the upper end has an inflation margin so that the inflated airbag 11 can reach the ceiling 35 and is abutted to the ceiling 35 even when the seat is set at either of the foremost position or the backmost position.

Next, the airbag apparatus 10A corresponding to reclining mechanism will be described with reference to FIG. 6(B).

Even when the seat back 51 is oscillated by the reclining mechanism in the direction shown by the arrow B to change the angle θ to the seat cushion 52 and the airbag 11 is inflated as shown by the arrow B1 while in the reclined status in which the inclination angle θ of the seat back 51 is an arbitrary angle within the range of 135<θ<165, the airbag 11 is configured so that the upper end thereof is abutted to the ceiling 35. The wrap amount HL is set so that, when the inclination angle of the seat back 51 is changed via the reclining mechanism, the upper end of the airbag 11 is abutted to the ceiling 35 even when the seat back 51 is at any angle position (135<θ<165). Specifically, the upper end of the airbag 11 has an inflation margin so that, even when the seat back 51 is set in the reclined status, the inflated airbag 11 is abutted to the ceiling 35 preferably in a fixed area, not in a dotted manner.

As described above, according to the airbag apparatus 10A of the second embodiment, even when the seat 50L has a different front-and-rear position or even when the seat is in a reclined status, the airbag 11 is allowed to inflate at a side collision and the upper end thereof is securely abutted to the ceiling 35 and the airbag 11 is supported and fixed by tension between the inflated outlet of the airbag 11 and the ceiling. This can consequently provide a reaction force to the occupant P as in the first embodiment.

Third Embodiment

Figure 7:
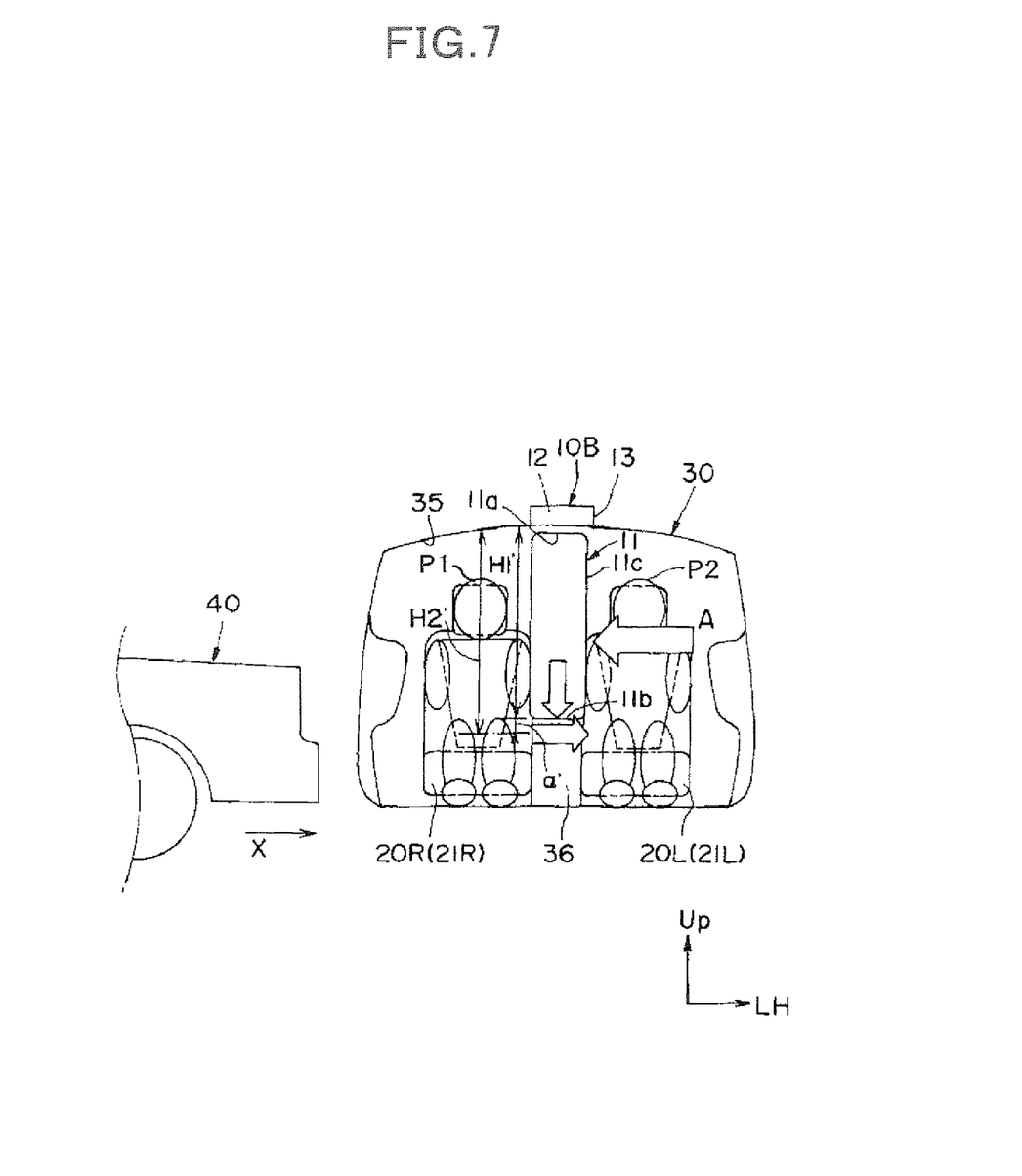
FIG. 7 illustrates a usage status of an airbag apparatus according to the third embodiment of the present invention.
Figure 8:
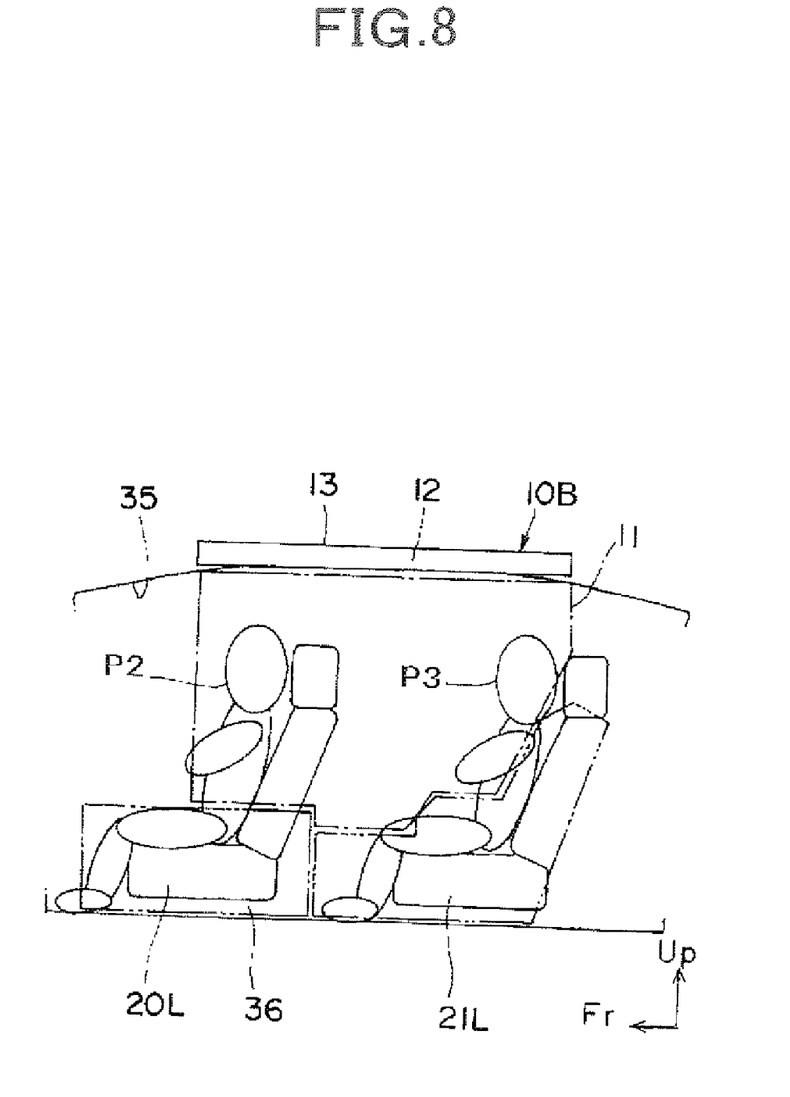
FIG. 8 is a schematic side view illustrating the airbag apparatus of FIG. 7.

FIG. 7 and FIG. 8 illustrate the inflated status of the third embodiment of the airbag apparatus according to the present invention. This airbag apparatus 10B is configured so as to function particularly effectively when occupants sit in seats in two lines arranged in the vehicle width direction and the front-and-rear direction, respectively. Specifically, when four occupants for example are sitting in a general passenger vehicle 30 having the front row having the left and right seats 20L and 20R and the rear row having the left and right seats 21L and 21R so that the front and rear rows are parallel to each other and the vehicle 30 is collided with another vehicle 40 from a side (when the right side face of the vehicle 30 collides with another vehicle 40 in the shown example), the bodies of occupants P2 and P3 sitting in the front seat 20L and the rear seat 21L at the opposite side of the impact, respectively, are restricted from moving to the collision side by the inflation of the airbag 11 at a region between two seats 20L and 20R and a region between the seats 20L and 21L.

Thus, the airbag apparatus 10B is provided in the vehicle interior ceiling at the upper side between the seat backs of the two left and right front seats 20L and 20R and the two left and right rear seats 21L and 21R. In order to allow the above-described airbag 11 to inflate, the airbag apparatus 10B includes the inflator 12 for jetting gas into the airbag 11.

In a normal status where no impact occurs, this airbag 11 is accommodated in the case 13 in a folded status. This case 13 is supported and fixed while being accommodated in the vehicle interior ceiling 35 at positions just above and between the seat backs of the two front seats 20L and 20R and the rear seats 21L and 21R. The inflator 12 is similarly placed in the case 13.

Figure 9:
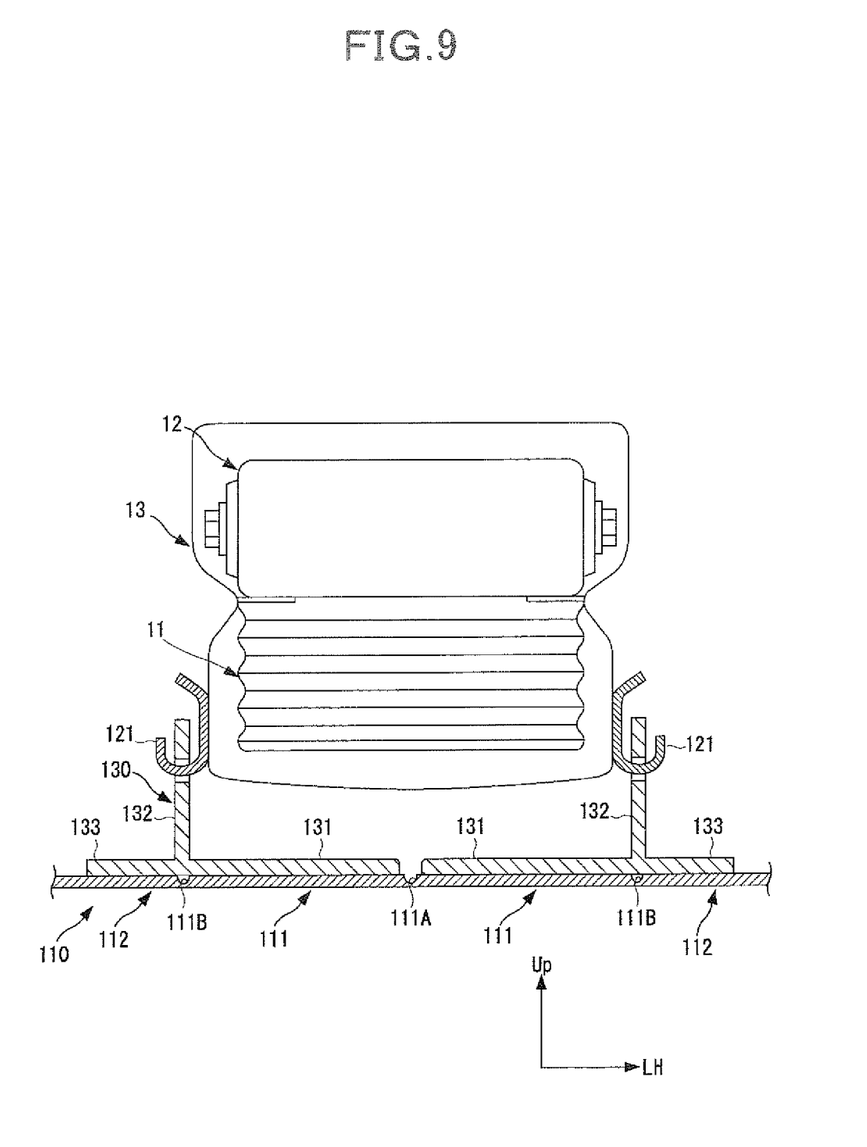
FIG. 9 is a schematic cross-sectional view illustrating the airbag apparatus of FIG. 7.

Specifically, as shown in FIG. 9, the airbag apparatus 10B is supported by a vehicle body constituting member such as a reinforce (not shown) that is provided at the back side of a panel 110 constituting the vehicle interior ceiling 35. The airbag apparatus 10B is configured so that the airbag 11 and the inflator 12 are included in a case (housing) 13.

The airbag 11 is configured to have a bag-like shape having a gas inflow opening and is formed by stitching a fabric cloth made of a polyester yarn or a polyamide yarn. The inflator 12 has a gas discharge outlet (not shown) through which the gas for inflating the airbag 11 is discharged.

The panel 110 is formed by providing the two rectangular airbag doors 111 so as to be adjacent to each other so that both of the airbag doors 111 can be opened at the boundary therebetween.

As shown in FIG. 9, the panel 110 has a dotted line or straight line-like cut that is formed along the boundary of the two airbag doors 111 and the outline thereof. The cut at the boundary of the two airbag doors 111 is denoted with the reference numeral 111A and the other cuts are denoted with the reference numeral 111B. These cuts 111A and 111B are formed along the vehicle front-and-rear direction and over the entire length of the airbag doors 111.

The panel 110 constituting the ceiling is configured as a synthetic resin-made panel base member that is formed by polypropylene (PP) for example to have a predetermined shape. The panel 110 may be configured by adhering covering material over the outer surface of this panel base member.

The airbag door 111 and the peripheral 112 formed at predetermined positions of the panel 110 are supported by a retainer 130 that is provided at the back side of the panel and that is locked to the airbag apparatus.

The retainer 130 is connected to the airbag apparatus to prevent a separation of the airbag door 111 when the airbag inflates. As shown in FIG. 9, this retainer 130 includes: a door support portion 131; a side plate portion 132 formed from the base end of the door support portion 131 to the inner side of the vehicle interior member to have a substantially plate frame-like shape so as to surround the four corners of the airbag apparatus; and a peripheral support portion 133.

The door support portions 131 support the airbag doors 111. The door support portions 131 are fixed to the airbag doors 111 in order to prevent the shattering of the airbag doors 111 when the doors are opened. As shown in FIG. 9, the door support portions 131 are separated at a region along the cut 111A at the boundary of the two airbag doors 111. Thus, the two door support portions 131 are fixed to the back face of the panel 110 so as to support the respective airbag doors 111.

The side plate portion 132 is a plate-like panel member raised from the base end of the door support portion 131 adhered to the back face of the airbag door 111 to the airbag apparatus at the back side of the panel 110. As shown in FIG. 9, the tip end of this side plate portion 132 is locked to the hook 121 of the airbag apparatus for example. The side plate portion 132 also has a function to guide a direction along which an airbag (not shown) is deployed at the inflation thereof.

The peripheral support portion 133 supports the panel 110 at the periphery of the airbag door and is fixed so as to be adhered to the back face of the panel of the periphery.

The retainer 130 is integratedly formed by resin molding. This resin material may be olefin-base thermoplastic elastomer (Thermo Plastic Olefin, so-called TPO) but also may be other materials. The retainer 130 is not limited to resin material and may be material such as steel.

According to the airbag apparatus 10B having the configuration as described above, a side collision is detected by a sensor (not shown) attached to the vehicle body of the automobile. This detection triggers the inflator 12 to jet gas into the airbag 11 to thereby cause the airbag 11 to inflate in the lower direction.

Next, the following section will describe the shape of the airbag 11 when the airbag 11 is inflated at the highest level (hereinafter referred to as "at inflation").

As shown in FIG. 7 and FIG. 8, the airbag 11 is made of fabric cloth and is formed to have a bag-like shape. The upper end 11a thereof is attached in the case 13 as described above. At the inflation of the airbag, the lower end 11b thereof is abutted to the vehicle interior lower side 36. The vehicle interior lower side 36 to which the lower end 11b of the airbag 11 is abutted at the inflation thereof is a center console in the shown case. However, the vehicle interior lower side 36 may be, depending on the structure of the automobile, a vehicle interior member such as a vehicle interior floor carpet or seat cushion.

In order to allow, at the inflation of the airbag 11, the lower end 11b of the airbag 11 to be abutted to the vehicle interior lower side 36 with a predetermined pressure, the airbag 11 is set to have the maximum inflation distance H2' in the up-and-down direction that exceeds the distance between the vehicle interior ceiling 35 and the vehicle interior lower side 36 (vehicle interior height H1'). Specifically, the airbag 11 is formed to have, at the inflation thereof, the inflation margin α' at the lower end 11b of the airbag 11. As a result, even after the airbag 11 is abutted to vehicle interior lower side 36 at the inflation thereof, the airbag 11 continues to inflate with the maximum inflation distance H2' and is abutted to the vehicle interior lower side 36 with a predetermined pressing force and the area S1 at which the lower end 11b is abutted to the vehicle interior lower side 36 is increased to thereby cause a strong friction force.

As shown in FIG. 8, the airbag 11 is structured to inflate in the lower direction from the position in the vehicle interior ceiling 35 at which the case 13 is attached and is designed to be opposed, in the vehicle front-and-rear direction, to the sides of the front seats 20L and 20R and the rear seats 21L and 21R. Thus, when being seen from the side, the airbag 11 in the inflated status covers the bodies of the occupants sitting in the front seats 20L and 20R and the rear seats 21L and 21R from the center side in the vehicle width direction.

The airbag apparatus 10B according to the embodiment of the present invention has the configuration as described above. In a normal status, i.e., when the airbag 11 is not inflated, the airbag 11 is stored in the case 13. When the vehicle in this status is collided with another vehicle coming from right side as shown by the arrow X in FIG. 7 for example, the impact is detected by a not shown sensor and this detection triggers the inflator 12 to jet gas into the airbag 11. As a result, as shown in FIG. 7 and FIG. 8, the airbag 11 is inflated from the vehicle interior ceiling 35 to the spaces between the seats 20L and 20R and the seats 21L and 21R. Then, the lower end 11b of the airbag 11 is securely abutted to the vehicle interior lower side 36 by the above-described inflation margin α' to cause friction therebetween.

Thus, in FIG. 7, even when the occupants at the opposite side of the side collision (impact opposite side), i.e., the occupants P2 and P3 sitting in the front passenger seats 20L and 21L, receive the load to the collision side as shown by the arrow A due to the side collision, the bodies of the occupants P2 and P3 are allowed to be abutted to the already-inflated airbag 11 to thereby receive the reaction force from the airbag 11. Therefore, the bodies of the occupants P2 and P3 are securely restricted from moving to the collision side.

At the inflation thereof, the airbag 11 is inflated, as shown in FIG. 8, in the front-and-rear direction in the range from the front seats 20L and 20R to the rear seats 21L and 21R. Thus, when a side collision occurs and when the bodies of the occupants P2 and P3 at the impact opposite side collide with the side face 11c of the inflated airbag 11, both of the body of the occupant P2 in the front seat 20L and the body of the occupant P3 in the rear seat 21L are securely abutted to the side face 11c of the one airbag 11. As a result, even when the seats 20L and 21L are adjusted and are slightly moved in the front-and-rear direction for example, all of the occupants P1 to P4 are securely protected at a side collision without causing the dislocation from the airbag 11 of the bodies of the occupants P2 and P3 at the impact opposite side.

The airbag apparatus 10B of the third embodiment is set to have a long length ranging from the front seat to the rear seat. However, it is clear that the airbag apparatus 10B also may be divided to two portions of a front portion and a rear portion so that the front portion and the rear portion are provided to the front seat and the rear seat, respectively.

The present invention can be carried out in various forms within the range not deviating from the intention. For example, the invention is not limited to the airbag shape in the above embodiments. For example, the width W1 of the airbag in the vehicle width direction at the inflation thereof (see FIG. 1) is not limited to the shown example and also may be about the interval D between neighboring seats 20R and 20L. When the inflated airbag has a large thickness in the vehicle width direction as described above, the airbag apparatus of the present invention can be attached to one seat of the two seats 20R and 20L arranged in the vehicle width direction to thereby protect the left and right occupants. The present invention also may be provided for each seat.

The place in which the airbag apparatus is stored is not limited to the above-described example. The airbag apparatus also may be stored in the inner side of the instrument panel, the interior of the console provided on the floor, or the lower side of the package tray at the rear side of the rear seat. The direction along which the airbag is deployed is also not limited to the above-described embodiments. Thus, the airbag also may be deployed in, instead of the up-and-down direction, a direction from the vehicle rear side to the vehicle front side or a direction from the vehicle front side to the vehicle rear side. In this case, the airbag has an inflation margin so that the tip end of the airbag in the inflation direction is abutted to the vehicle interior to allow the tip end to receive sufficient friction from the vehicle interior.

For example, the first embodiment has illustrated a configuration in which the airbag apparatus is stored in the seat back and is deployed from the vehicle lower side to the vehicle upper side and the inflation margin at the upper end of the airbag is abutted to the ceiling. However, another configuration also may be used in which the airbag apparatus is provided at the inner side of the instrument panel and the airbag is allowed to inflate from the vehicle front side to the vehicle rear side and also to the vehicle upper side and the upper end of the airbag having an inflation margin is abutted to the ceiling for example.

A configuration may be used in which the airbag apparatus is provided in the seat cushion of the front seat as in the first embodiment and the airbag is allowed to inflate from the vehicle rear side to the vehicle front side and the tip end of the airbag in the inflating direction has an inflation margin so that the tip end of the airbag is abutted to the instrument panel and/or windshield.

When the move of the occupants sitting in the rear seats of the second or third row to the collision side is restricted at a side collision, the airbag deployed among the seats arranged in the vehicle width direction may be configured so that a portion thereof is abutted to the back face of the seat back of the front seat.

The third embodiment has described a case where the airbag is inflated from the ceiling to the floor side, i.e., from the vehicle upper side to the vehicle lower side. However, another configuration also may be used where the airbag apparatus is provided in the console provided on the floor and the airbag is allowed to inflate from the vehicle lower side to the vehicle upper side, i.e., from the floor side to the ceiling side. In this case, at the inflation of the airbag, the upper end of the airbag is abutted to the ceiling and the upper end of the airbag preferably has an inflation margin.

A portion in the airbag that is abutted to the vehicle interior and a portion in the vehicle interior that is abutted to the airbag may be configured to have a higher surface friction coefficient than those of other portions or to have a higher rigidity than those of other portions. The increased friction coefficient or rigidity as described above may be applied to one or both of the airbag-side and the vehicle interior-side.

The structure in which the airbag apparatus is attached to a seat and a ceiling for example is not limited to the above-described example. Thus, the conventionally-known structure for attaching the airbag apparatus to the seat, e.g., configurations disclosed in Japanese Unexamined Patent Application Publication No. 2000-135961 and Japanese Unexamined Patent Application Publication No. 2001-171468, also may be used.

In the above-described third embodiment, a case was mainly described in which the airbag 11 in an automobile having two rows of front seats and rear seats is allowed to inflate between left and right occupants over the front and rear seats. However, the invention is not limited to this. The invention also can be configured to include airbags in order to cover the respective rows of seats when a plurality of rows, three rows for example, of seats are provided or in order to allow the airbags to inflate in regions among the respective sitting positions or the respective seats when a bench seat is provided in which three or more occupants are sitting to form a lateral line or three or more seats are closely arranged in the left-and-right direction.

What is claimed is:

1. An airbag apparatus inflating between two seats arranged in a vehicle width direction to protect an occupant, comprising:
    an inflator and a folded airbag, wherein
    the inflator and the airbag are provided at an inner side of a seat back to inflate the airbag between the two seats,
    the airbag is configured so that an upper end is abutted to a ceiling by a gas jetted from the inflator, and
    the gas jetted from the inflator into the airbag causes the airbag to abut to a vehicle interior thereby suppressing the move of the airbag when the occupant pushes the airbag.

2. The airbag apparatus according to claim 1, wherein
    the upper end of the airbag has an expansion margin so that the airbag can inflate to a position higher than the ceiling.

3. The airbag apparatus according to claim 1, wherein
    the upper end has an expansion margin so that the inflated airbag is abutted to the ceiling even when the seat back is set in a reclined status.

4. The airbag apparatus according to claim 1, wherein
    the upper end has an expansion margin so that the inflated airbag is abutted to the ceiling even when the seat is set at any front-and-rear position.

5. An airbag apparatus inflating between two seats arranged in a vehicle width direction to protect an occupant, comprising:
    an inflator and a folded airbag, wherein
    the inflator and the airbag are stored in a position higher than a surface of a seat cushion to inflate the airbag between the two seats, and
    a gas jetted from the inflator into the airbag causes the airbag to abut to a vehicle interior thereby suppressing the move of the airbag when the occupant pushes the airbag.

* * * * *